(12) United States Patent
Revol

(10) Patent No.: US 6,483,206 B1
(45) Date of Patent: Nov. 19, 2002

(54) ELECTRIC POWER SUPPLY SYSTEM FOR SIMPLIFYING THE ARCHITECTURE OF POWER AND AIR-CONDITIONING INSTALLATIONS

(75) Inventor: René Revol, Longjumeau (FR)

(73) Assignee: France Telecom, Paris (FR)

( * ) Notice: Subject to any disclaimer, the term of this patent is extended or adjusted under 35 U.S.C. 154(b) by 0 days.

(21) Appl. No.: 09/530,357
(22) PCT Filed: Feb. 10, 1999
(86) PCT No.: PCT/FR99/00294
§ 371 (c)(1), (2), (4) Date: Apr. 26, 2000
(87) PCT Pub. No.: WO99/41821
PCT Pub. Date: Aug. 19, 1999

(30) Foreign Application Priority Data

Feb. 16, 1998 (FR) .............................. 98 01845

(51) Int. Cl.⁷ ................................................. H02J 7/00
(52) U.S. Cl. ....................................................... 307/66
(58) Field of Search ............................ 307/48, 49, 64, 307/65, 66, 72–75, 80

(56) References Cited

U.S. PATENT DOCUMENTS

| | | | | |
|---|---|---|---|---|
| 4,779,050 A | * | 10/1988 | Ohmari ...................... 324/426 |
| 5,384,792 A | * | 1/1995 | Hirachi ........................ 371/66 |
| 5,777,454 A | * | 7/1998 | McAndrews ................. 320/51 |
| 5,929,538 A | * | 7/1999 | O'Sullivan .................... 307/66 |
| 6,011,324 A | * | 1/2000 | Kohlstruck et al. ........... 307/64 |

FOREIGN PATENT DOCUMENTS

| | | |
|---|---|---|
| EP | 0734113 | 9/1996 |
| GB | 2184903 | 7/1987 |

OTHER PUBLICATIONS

Chigolet, J.C. "Les Turbo–alternateurs . . . " Intl' Tele's Energy Conf. Sep. 27–30, 1993; vol. 1, No. Conf. 15, Sep. 27, 1993 p. 298–302 Societe des Electriciens et des Electroniciens.

* cited by examiner

Primary Examiner—Matthew Nguyen
(74) Attorney, Agent, or Firm—Roland Plottel

(57) ABSTRACT

A power supply system for uninterruptedly sensitive equipment having a supply interface with a local power line, e.g., of 230V/50 Hz. It has downstream of a high voltage/low voltage transformation station, a direct connection towards at least one Uninterruptable Power Supply (UPS), enabling elimination of the Normal/Standby switch between the local electric network and a replacement source. The UPS, which comprises batteries in parallel and a quick switching device (t<20 ms), automatically ensures the launching (or triggering) of the standby source in case of breakdown of the local electric power supply network. Reciprocally a standby source, which is directly coupled with the UPS batteries, delivers the direct current required for maintaining the charge of said batteries.

6 Claims, 1 Drawing Sheet

ELECTRIC POWER SUPPLY SYSTEM FOR SIMPLIFYING THE ARCHITECTURE OF POWER AND AIR-CONDITIONING INSTALLATIONS

BACKGROUND OF THE INVENTION

1. Field of the Invention

The present invention relates to an uninterruptible power supply system intended for sensitive equipment supplied from the public power distribution network and required to produce an equivalent voltage in the event of interruptions or disturbances to the public network.

It is aimed in particular at making it possible to power telecommunications equipment or computer equipment, or more generally any equipment for industrial use which accepts neither service interruptions nor brownouts.

2. Description of the Related Art

The equipment commonly encountered in the telecommunications sector is generally supplied with DC current at a voltage of 48 volts or with AC current at a voltage of 230 volts. This AC voltage originates from the local electricity distribution network which is generally backed up by a generating set, permanently, depending on the type of system powered.

Power supply chains conventionally comprise three different levels of conversion:

- a primary level with a high voltage/low voltage transformation station, a generating set and a low-voltage distribution board;
- a secondary level with rectifiers and accumulator batteries which constitute a 48-volt energy source;
- a centralized tertiary level with power inverters which deliver an AC voltage of 230 volts.

The primary level is generally situated within technical premises (cellar, basement, ancillary premises) which are remote from the equipment rooms which comprise the secondary level and the tertiary level.

Accumulator batteries have been made reliable through the use of leakproof batteries and computer monitoring facilities which scan the failure modes.

The architecture of the present generation of power supply chains must evolve on account of the alterations encountered in the equipment:

- the rising proportion of equipment exhibiting a 230 V/50 Hz power supply interface, to the detriment of the 48 V interface,
- the considerable reduction in the power consumed by telecommunications equipment,
- the ability of equipment to operate at extreme temperatures with no impact on their lifetime and on the quality of service.

These evolutionary factors lead to the favouring of second-generation power supply systems based on an architecture which includes Uninterruptible Power Supplies (UPS) to the detriment of 48 V sources and inverters.

French Patent 2 693 052 or the document CHIGOLET JC et Al. disclose power supply chains of the new generation whose operating principle exploits a technique of optimized and distributed energy. This technique makes it possible:

- to separate the power supply and energy storage functions in the UPS of OFF LINE type so as to optimize the management of the batteries and thereby to increase their lifetime,
- to improve the energy efficiency of the uninterruptible power supply chain as compared with the present-day technical solutions,
- to relocate the AC distribution racks to the technical premises rather than in the equipment rooms, which will make it possible to eliminate operator constraints: weight of the cabinet-mounted batteries, effects of high temperature on the lifetime of 5 the batteries when the production of cold is deliberately reduced so as to achieve energy savings,
- risks of disturbances through electromagnetic radiation related to the closeness of the UPSs, maintaining of raised floors so as to conceal the large cross-section cables required for distribution at 48 V.

The British document GB-A-2 184 903 also discloses an installation which uninterruptibly supplies power to sensitive equipment exhibiting a current-supply interface. This installation comprises batteries and a fast switching device making it possible automatically to trigger a replacement source, the said replacement source ensuring that the charge of the said batteries is maintained by way of a rectifier.

The document EP 0 734 113 describes a system which exploits the inertia of the rotor, which continues to rotate even when the main power supply is cut, to trigger another generator which will cater for the electrical provision. Moreover, the presence is noted in this document of a Normal/Backup changeover switch (or LCI—Load Commutated Inverter) which switches over the networks, in the event of a failure.

These technical solutions of the new generation will enable the equipment to be powered at 230 V by UPSs which are located remotely in technical premises, with small cross-section distribution cables which can be trunked over decking or duckboards.

The drawbacks of the solutions known hitherto lie, on the one hand mainly in the recourse to backup sources which call upon generating sets, driven by diesel sets having non-negligible operational constraints:

- environmental pollution (operating noise, vibrations, exhaust gases)
- mediocre performance and dimensioning constraints,
- high operational cost (preheating, servicing, etc.), and on the other hand in the use of a low-voltage board and of a Normal/Backup changeover switch (changeover switch and shunting device).

Moreover, the generating sets require a startup system dedicated to the replacement source (battery, rectifier, charger).

The present generation of solutions additionally requires ancillary backup devices for maintaining the connected equipment operational (backup for the air-conditioning, inverters protecting the computers against brownouts and disturbances, etc.)

BRIEF SUMMARY OF THE INVENTION

The present invention aims to alleviate these drawbacks by proposing an Uninterruptible Power Supply system which does not include any function of Normal/Backup swapover between the local electrical network and the replacement source, this replacement source moreover being environmentally friendly.

To this end, system which uninterruptibly supplies power to sensitive equipment exhibiting an AC current supply interface, is characterized in that it comprises downstream of a high/low voltage transformation station, a direct link to at least one uninterruptible power supply (UPS) unit which comprises batteries in parallel and a fast switching device, making it possible automatically to ensure the triggering or the starting up of a replacement source (RS) in the event of a failure of the local electricity network, the said replacement source being coupled to the said batteries of the (UPS) and delivering a DC current required for maintaining the charge of the said batteries, thereby making it possible to dispense with the Normal/Backup changeover switch of the low-voltage distribution situated upstream of the (UPS).

BRIEF DESCRIPTION OF THE SEVERAL VIEWS OF THE DRAWINGS

Other characteristics and advantages of the present invention will emerge from the description given below, with reference to the appended drawings which illustrate an exemplary embodiment thereof devoid of any limiting character. In the figures.

DETAILED DESCRIPTION OF THE INVENTION

Figure 1:
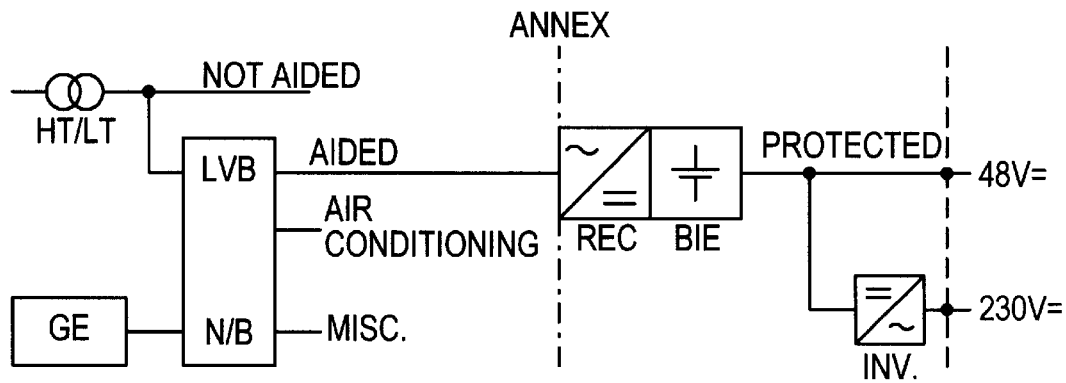
FIG. 1 is a schematic view of a conventional first-generation power supply chain.

Represented in FIG. 1 by HT/LT is the 25 high/low voltage transformation station, by GE the generating set responsible for supplying the installation with electrical power in the event of a failure of the local electrical network, by LVB N/B the technical rack which furthermore includes the low-voltage board and the Normal/Backup swapover device, by REC BIE the rectifiers and the accumulator batteries, and by INV the power inverters.

Figure 2:
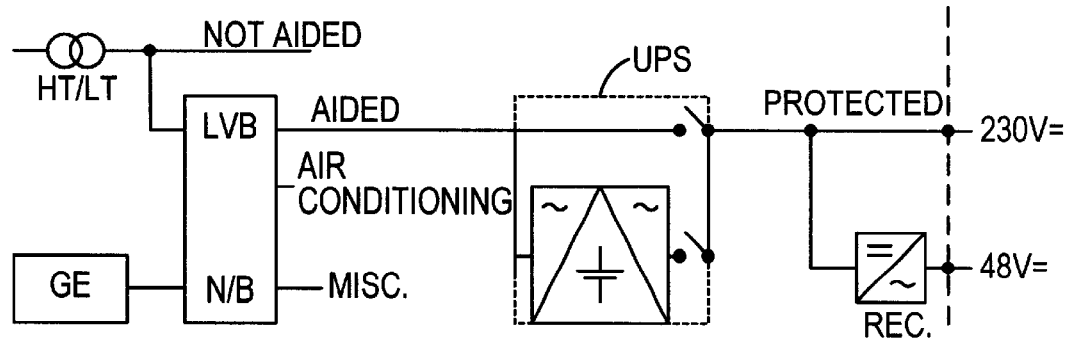
FIG. 2 is a schematic view of a new-generation power supply chain comprising an Uninterruptible distributed-storage Power Supply.

Represented in FIG. 2, over and above FIG. 1, by UPS is an uninterruptible power supply comprising a fast-switching breaker allowing outage-free powering of the equipment, placed downstream, from the UPS.

Figure 3:
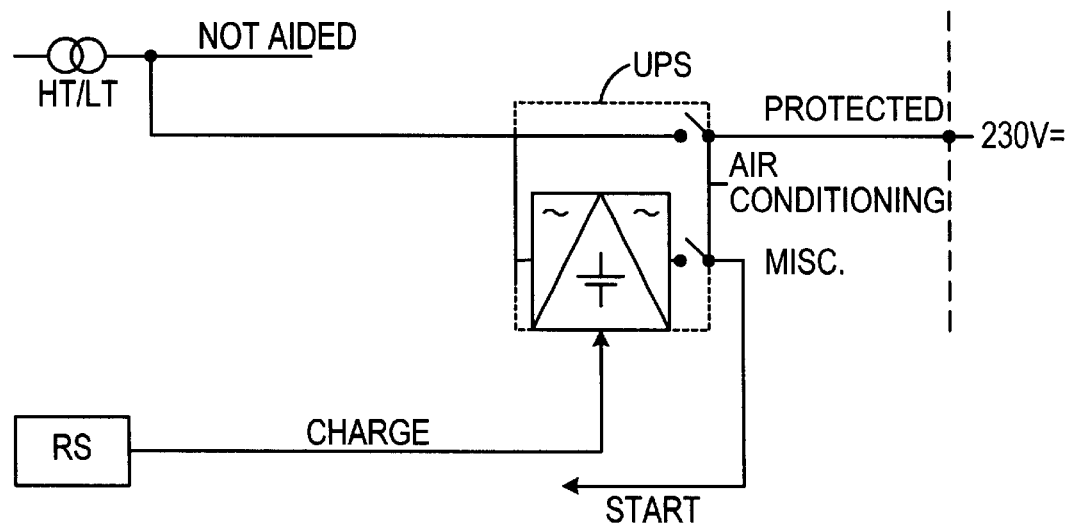
FIG. 3 is a schematic view of a power supply chain forming the subject of the invention, comprising a Simplified Architecture Designed for the Technical and Energy Environment.

Illustrated in FIG. 3 by RS are the replacement sources making it possible to recharge the accumulator batteries included within the UPS, these latter also being able to bring the replacement sources into operation.

Represented by a thin chain-dotted line in FIGS. 1, 2 and 3 is the separation between the technical premises and the equipment room.

According to a preferred embodiment of the power supply system, an Uninterruptible Power Supply is connected downstream of a HT/LT transformation station of a local electrical network, which is by definition not backed up.

The medium-duration energy storage circuit of the UPS is associated with a standard conversion device (inverter) placed on standby, which is responsible for providing an outage-free AC voltage while awaiting start-up or the provision of energy to the UPS by the replacement sources.

Thus, if the local electrical network is cut of f or exhibits faults or irregularities for a period of a few minutes, no disturbance will be observed in the operation of the sensitive equipment so long as it accepts brownouts of less than 20 ms duration.

Conventionally, a UPS of __OFF-LINE__type has a medium-duration energy reserve and comprises a separation transformer, the objective of which is a high degree of safety of personnel and the carrying out of a first filtering of network glitches. Batteries having a voltage of between in particular 200 and 400 V ensure self-sustaining operation in the standby state, by virtue of a fast switch for toggling between the network and the inverter.

Downstream of the UPS, that is to say at the output of the inverter, there is provision to locate a distribution box, to which are connected supply lines which it is desired to make safe, and thus into which are plugged the equipment for industrial use which accept neither service interruptions, nor brownouts of greater than 20 ms (telephone and computer equipment, air-conditioning, backup lighting etc.).

According to another characteristic of the invention, a DC current source originating from a replacement source RS is coupled with the batteries constituting the store of energy in the UPS. This DC current source maintains the charge of the batteries of the UPS in the event of a failure of the local electrical network.

This so-called __direct__wiring makes it possible to dispense with the Normal/Backup swapover function and also with the low-voltage board LVB which exists in the known solutions of the prior art (first and second generations).

According to another aspect of the invention, the replacement sources IRS consist in particular of turbo generators or of fuel cells, which are started up, in the event of a fault encountered in the supply of the local electrical network, by means of a current originating from the batteries of the UPS. Indeed, these batteries have high power and the triggering or the starting up of the replacement sources IRS is effected progressively, requiring only a low intensity on start-up.

If a turbo generator is used as replacement source, the alternator which is preferably of small diameter, is spun at a high and constant speed of rotation, through the use of a turbine, and possibly at the same speed of rotation as the turbine, in such a way as to deliver a high-frequency current, which is transformed into DC current after rectification and filtering, and which is able to recharge the batteries of the UPS at constant voltage.

If a fuel cell is used as replacement source, the latter comprises a certain number of elementary cells, mounted in series, which deliver a DC current at a high voltage which is directly useable for recharging the batteries built into the UPS at constant voltage.

Regardless of the type of replacement source IRS, the batteries are instantaneously invoked by the inverter of the UPS in the event of a failure of the local electrical network, in such a way as to ensure a secure power supply for the equipment connected to the UPS.

The batteries of the UPS can also be recharged 5 by way of an alternator rotated by a low-speed generating set; nevertheless this technical solution involves extra cost in view of the adaptation required for the production of a DC current.

The invention described above offers multiple advantages in regard, on the one hand to the reduction in hardware investment costs (elimination of the low-voltage board LVB, of the Normal/Backup changeover switch, elimination of the system for starting up the replacement source, elimination of the air-conditioning backup device, elimination of the inverters protecting the computer network, and on the other hand to the improvement in the operational conditions, disappearance of current outages during Normal/Backup switchover, constant quality of the secure supply, self-sustaining operation which is homogeneous from the thermal and electrical standpoint, improvement in start-up reliability of the replacement sources through optimized management of the batteries built into the UPS. Moreover, this entire power supply system is built into the ancillary premises of an installation away from the operational premises, by virtue of the distributed voltage which ranges from 48 V (for DC) to 230 V (for AC). This arrangement makes it possible to reduce the length of the link between the UPS and the start-up system.

It is of course obvious that the present invention is not limited to the exemplary embodiments described and represented hereinabove, but that it encompasses all variants thereof.

What is claimed is:

1. System which uninterruptibly supplies power to sensitive equipment exhibiting a current supply interface, comprising downstream of a high/low voltage transformation station (HT/LT), a direct link to at least one uninterruptible power supply unit (UPS) which comprises batteries in parallel and a fast switching device, making it possible automatically to ensure the triggering or the starting up of a replacement source (RS) in the event of a failure of the local electricity network, said replacement source (RS) being coupled to said batteries of the supply unit (UPS) and delivering a DC current required for maintaining the charge of said batteries, thereby making it possible to dispense with the Normal/Backup changeover switch.

2. Uninterruptible power supply system according to claim 1, wherein the replacement source (RS) comprises a fuel cell, delivering the DC current.

3. Uninterruptible power supply system according to claim 1, wherein the replacement source (RS) comprises a turbogenerator, delivering the DC current.

4. Uninterruptible power supply system according to claim 1, wherein the replacement source (RS) comprises a generator or an alternator rotated by a low-speed generating set, adapted for delivering DC current.

5. Uninterruptible power supply system according to any one of the preceding claims 1-3, wherein the power supplies which one wishes to make secure relate in particular to air-conditioning, backup lighting, the power supply of the replacement source (RS) and telephone and computer equipment.

6. Uninterruptible power supply system according to claim 4, characterized in that it is built into an ancillary premises of an installation thus equipped so as to make it possible to reduce the length of the link between the supply unit (UPS) and a start-up system.

* * * * *